April 5, 1927.
B. H. MEYERING
PHOTOGRAPHIC FILM PACKAGE
Filed July 24, 1924
1,623,486
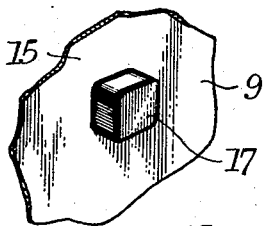
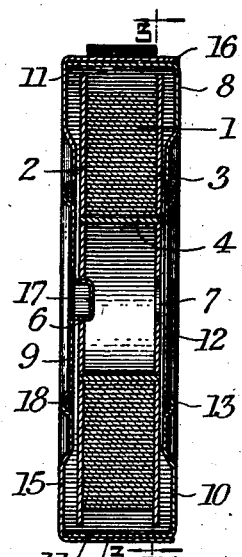
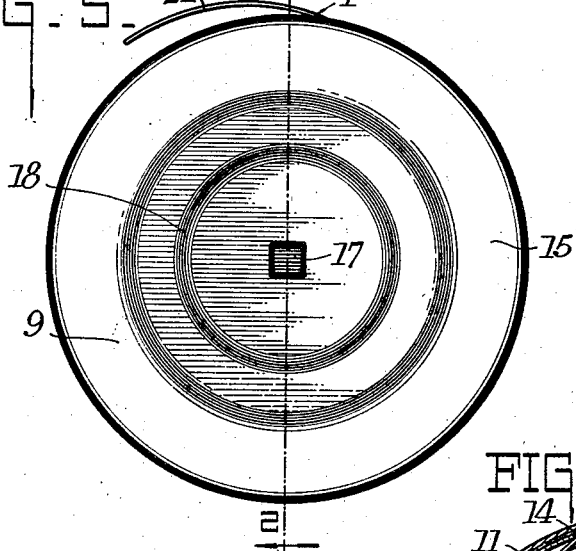
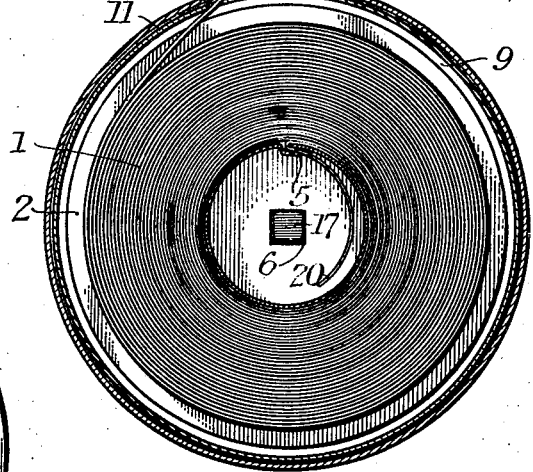
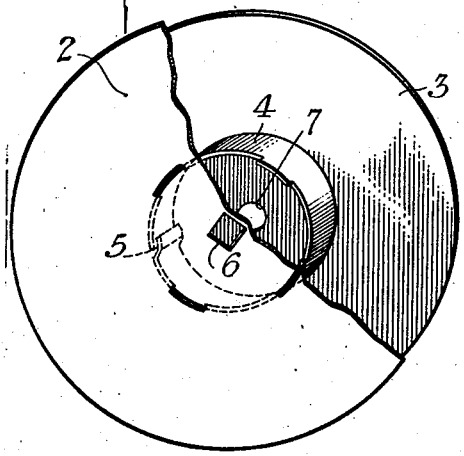
INVENTOR.
Bernard H. Meyering,
BY
ATTORNEYS.

Patented Apr. 5, 1927.

1,623,486

UNITED STATES PATENT OFFICE.

BERNARD H. MEYERING, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM PACKAGE.

Application filed July 24, 1924. Serial No. 728,035.

My invention relates to a photographic film package and more particularly to such a package in which a reel of motion picture film may be marketed and in which the film will be protected until it is used in a suitable camera.

In certain such packages now in use the film is wound on a reel which is enclosed in a magazine, one end of the film being secured to the core of the reel and the other end being led out through slots in the magazine by which it is held. There is a very appreciable tendency for the film to unwind and as its opposite ends are secured, it acts like a clock spring and tends to turn the reel. The result is that when the magazine is opened, and the parts thereof removed from the reel the convolutions are found to be somewhat loosened and the outer coils spring out beyond the periphery of the reel and permit the film to become more or less fogged.

The object of my invention is to overcome this tendency and prevent the convolutions becoming loosened or uncoiled. I accomplish this by forming on one side of the magazine and of the reel cooperating parts that prevent the reel turning with respect to the magazine. The film then remains, until the reel is removed from the magazine, as tightly coiled as when the package was assembled.

Reference will now be made to the accompanying drawing, in the various figures of which the same reference characters indicate the same parts and in which:

Fig. 1 is a side view of my improved package;

Fig. 2 is a section on line 2—2 of Fig. 1;

Fig. 3 is a section on line 3—3 of Fig. 2;

Fig. 4 is a perspective view of the reel with parts broken away;

Fig. 5 is a fragmentary view showing the projection on the inner wall of the magazine.

A long film strip 1 is wound upon a reel having side flanges 2 and 3 and a core 4. The inner end 20 of the film strip is attached to the core by means of any suitable slot or catch arrangement such as is shown at 5. By film strip I mean a long strip of flexible material, the greater part or all of which is photographically sensitized. In the form shown the film is designed for use in a small, portable, motion picture camera. Axially of the flanges 2 and 3 of the reel are formed apertures 6 and 7 respectively, the aperture 6 being square and 7 being round, and the length of one side of aperture 6 being the same as the diameter of aperture 7. The reel is contained in a magazine of the "pill box" type comprising two telescoping members 8 and 9. The inner member 8 has a bottom 10 overlying flange 3 of the reel and a flange 11 surrounding the periphery of the reel. In the bottom 8 are a large axial opening 12 and strengthening ribs 13 and in the flange 11 is a slot 14. The outer member 9 has a bottom 15 overlying flange 2 of the reel and a flange 16 overlapping flange 11 of member 8. The bottom 15 has strengthening ribs 18 and a central inwardly struck lug or boss 17 which is shaped to fit into the aperture 6. The flange 16 has a slot 19.

The reel filled with film wound in convolutions with the desired tightness is placed in the magazine member 8 and the outer end 21 of the film strip 1 slipped through the open ended slot 14. The outer magazine member 9 is then slipped over the reel and the inner magazine member, with outer end 21 of the film strip extending through slot 19. The member 8 is positioned so that the lug 17 fits into the aperture 6. The magazine members are finally positioned so that the slots 14 and 19 are out of registry and a portion of the end 21 of the film strip clamped tightly between them as shown in Fig. 3, so that the magazine members can be moved with respect to each other only with difficulty and, for purposes of shipment and storage, have a definite fixed relation forming a rigid container. The member 9 has both a reel engaging part 17 and a film clamping part 19 which are thus fixed in their relative positions.

It is to be understood that the unwinding tendency of the film is not so great as to cause the reel to turn noticeably during this assembling process, but is a constant slight force that tends, little by little, to turn the reel in the magazine under the jars and knocks occurring in transportation. Such unwinding is positively prevented in my improved package which is delivered to the consumer in good condition and ready for use.

It is to be understood that the above described embodiment is by way of example and that I contemplate as within the scope of my invention all such modifications and equivalents as fall within the terms of the appended claims.

Having thus described my invention what I claim as new and desire to secure by Letters Patent is:

1. As an article of manufacture, a film package comprising a container, a reel therein having a fixed, definite position with respect thereto and nonrotatable with respect to the whole container, and a band wound on the reel and having one end fixedly held on the reel and the other end secured to the container.

2. As an article of manufacture, a film package comprising a reel, a film strip wound thereon, and a container therefor, the walls of which have a fixed definite relation, one end of the film strip being attached to the container and the other end being attached to the reel, and the reel being held against rotary movement within the container whereby both ends of the film are fixedly held and the film is thereby positively prevented from accidental uncoiling.

3. As an article of manufacture, a film package comprising a reel, a film strip wound thereon, and a container therefor, one end of the film strip being attached to the container and the other end being fixedly held on the reel, and co-operating means on the reel and the container to prevent relative rotary movement between them, the point of attachment of the film to the container having a fixed position with respect to the cooperating means, whereby both ends of the film are fixedly held and the film is thereby positively prevented from accidental uncoiling.

4. As an article of manufacture, a film package comprising a reel, a film strip wound thereon, and a container therefor, one end of the film strip being attached to the container and the other end being attached to the reel, and interengaging means on the reel and the container positively preventing relative rotary movement between them, the point of attachment of the film to the container having a single definite position with respect to the interengaging means, whereby both ends of the film are fixedly held and the film is thereby positively prevented from accidental uncoiling.

5. As an article of manufacture, a package of motion picture film comprising a reel with a polygonal opening in one side thereof, a container for said reel having a corresponding polygonal lug adapted to fit within said opening to prevent rotational movement of the reel, and a film strip wound on said reel and having a natural tendency to uncoil, one end of the film strip being attached to the reel and the other to the container, the point of attachment of the film to the container having a fixed position relative to the lug, whereby both ends of the film are fixedly held and the film is thereby positively prevented from accidental uncoiling.

6. As an article of manufacture, a package of motion picture film comprising a reel with side flanges and a core, one of said side flanges having a non-circular axial opening, a container for said reel having in one side a correspondingly shaped lug adapted to fit within said opening and positively prevent rotational movement of the reel, and a film strip wound on said reel and having a natural tendency to uncoil, one end of the film strip being attached to the core and the other to the container, the point of attachment of the film to the container having a predetermined definite position relative to the lug, whereby both ends of the film are fixedly held and the film is thereby positively prevented from accidental uncoiling.

7. As an article of manufacture, a package of motion picture film comprising a reel with side flanges and a core, one of said side flanges having a square axial opening, a continuous film strip having a natural resilience wound on said reel with one end thereof attached to the core thereof, and a magazine comprising two members having bottoms overlying the sides of the reel and overlapping flanges overlying the periphery of the reel, said flanges having slots by which the other end of the film strip is secured, and a square lug on one of the bottoms fitting within the opening in the reel, whereby the reel is prevented from turning in the magazine, whereby the members are held against accidental relative movement, and whereby both ends of the film strip are fixedly held and the film strip is thereby positively prevented from uncoiling due to its natural resilience.

Signed at Rochester, New York, this 18th day of July, 1924.

BERNARD H. MEYERING.